(12) United States Patent
Zhang et al.

(10) Patent No.: US 10,209,398 B2
(45) Date of Patent: Feb. 19, 2019

(54) DRILLING FLUID PROPERTY DETERMINATION

(71) Applicant: Halliburton Energy Services, Inc., Houston, TX (US)

(72) Inventors: Zhijuan Zhang, Houston, TX (US); Weijun Guo, Houston, TX (US); Sriram Srinivasan, Katy, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 15/119,299

(22) PCT Filed: Dec. 3, 2015

(86) PCT No.: PCT/US2015/063711
§ 371 (c)(1),
(2) Date: Aug. 16, 2016

(87) PCT Pub. No.: WO2016/153567
PCT Pub. Date: Sep. 29, 2016

(65) Prior Publication Data
US 2017/0052280 A1 Feb. 23, 2017

Related U.S. Application Data

(63) Continuation-in-part of application No. PCT/US2015/022729, filed on Mar. 26, 2015, which
(Continued)

(51) Int. Cl.
*G01V 1/48* (2006.01)
*G01V 11/00* (2006.01)
(Continued)

(52) U.S. Cl.
CPC ............ *G01V 11/002* (2013.01); *E21B 47/09* (2013.01); *E21B 47/14* (2013.01); *E21B 49/08* (2013.01);
(Continued)

(58) Field of Classification Search
CPC . G01V 1/40; G01V 1/402; G01V 1/48; G01V 5/04; G01V 5/12; G01V 11/00;
(Continued)

(56) References Cited

U.S. PATENT DOCUMENTS 1,922,571 A 8/1933 Deline
4,462,082 A 7/1984 Thiele et al.
(Continued)

FOREIGN PATENT DOCUMENTS

EP 0159484 A1 10/1985
EP 1522848 A1 4/2005
(Continued)

OTHER PUBLICATIONS

"International Application Serial No. PCT/US2015/022729, International Search Report dated Dec. 18, 2015", 3 pgs.
(Continued)

*Primary Examiner* — David Bolduc
(74) *Attorney, Agent, or Firm* — Gilliam IP PLLC (57) ABSTRACT

In some embodiments, an apparatus, system, and method may operate to determine the density of drilling fluid associated with photon activity in the drilling fluid using an array of nuclear detectors. Further activity may include determining acoustic impedance of the drilling fluid as a combination of the density and acoustic velocity. Additional apparatus and systems, as well as methods, are disclosed.

18 Claims, 8 Drawing Sheets

Related U.S. Application Data is a continuation-in-part of application No. PCT/US2015/022748, filed on Mar. 26, 2015.

(51) Int. Cl.

| | | |
|---|---|---|
| *E21B 47/09* | (2012.01) | |
| *E21B 47/14* | (2006.01) | |
| *G01V 5/04* | (2006.01) | |
| *G01V 1/40* | (2006.01) | |
| *G01V 5/12* | (2006.01) | |
| *E21B 49/08* | (2006.01) | |
| *E21B 47/00* | (2012.01) | |

(52) U.S. Cl.
CPC .................. *G01V 1/40* (2013.01); *G01V 1/48* (2013.01); *G01V 5/04* (2013.01); *G01V 5/12* (2013.01); *E21B 47/0005* (2013.01); *G01V 11/00* (2013.01)

(58) Field of Classification Search
CPC ....... G01V 11/002; E21B 47/09; E21B 47/14; E21B 49/08
See application file for complete search history.

(56) References Cited

U.S. PATENT DOCUMENTS

| | | | |
|---|---|---|---|
| 4,576,034 A | 3/1986 | Ferree et al. | |
| 5,451,779 A | 9/1995 | Spross et al. | |
| 5,486,695 A | 1/1996 | Schultz et al. | |
| 5,912,460 A | 6/1999 | Stoller et al. | |
| 7,587,936 B2 | 9/2009 | Wei | |
| 8,321,131 B2 | 11/2012 | Case | |
| 2001/0035312 A1* | 11/2001 | Han ..................... | E21B 47/101 181/115 |
| 2007/0119243 A1 | 5/2007 | Smits et al. | |
| 2008/0186805 A1 | 8/2008 | Han | |
| 2009/0288820 A1 | 11/2009 | Barron et al. | |
| 2010/0076688 A1 | 3/2010 | Moake | |
| 2010/0270462 A1 | 10/2010 | Nelson et al. | |
| 2010/0314535 A1 | 12/2010 | Zhang et al. | |
| 2011/0029246 A1 | 2/2011 | Nikitin et al. | |
| 2011/0191027 A1 | 8/2011 | Pfutzner et al. | |
| 2011/0284732 A1 | 11/2011 | Korkin et al. | |
| 2012/0059587 A1 | 3/2012 | Marsh et al. | |
| 2012/0119077 A1 | 5/2012 | Smaardyk et al. | |
| 2012/0138782 A1 | 6/2012 | Simon et al. | |
| 2012/0192640 A1 | 8/2012 | Minh et al. | |
| 2013/0202090 A1 | 8/2013 | Belcher et al. | |
| 2013/0215715 A1 | 8/2013 | Hollstein et al. | |
| 2013/0271066 A1 | 10/2013 | Signorelli et al. | |

FOREIGN PATENT DOCUMENTS

| | | |
|---|---|---|
| EP | 1922571 B1 | 8/2012 |
| WO | WO-20080061225 A1 | 3/2008 |
| WO | 2009151350 A1 | 12/2009 |
| WO | 2012058579 A2 | 5/2012 |
| WO | WO-2013101981 A1 | 7/2013 |
| WO | 2016153566 A1 | 9/2016 |

OTHER PUBLICATIONS

"International Application Serial No. PCT/US2015/022729, Written Opinion dated Dec. 18, 2015", 10 pgs.

"International Application Serial No. PCT/US2015/022748, International Search Report dated Dec. 24, 2015", 3 pgs.

"International Application Serial No. PCT/US2015/022748, Written Opinion dated Dec. 24, 2015", 6 pgs.

"International Application Serial No. PCT/US2015/063693, International Search Report dated Feb. 3, 2016", 3 pgs.

"International Application Serial No. PCT/US2015/063693, Written Opinion dated Feb. 3, 2016", 4 pgs.

"International Application Serial No. PCT/US2015/063711, International Search Report dated Mar. 15, 2016", 3 pgs.

"International Application Serial No. PCT/US2015/063711, Written Opinion dated Mar. 15, 2016", 9 pgs.

Moake, G. L., et al., "Standoff and Caliper Measurements While Drilling Using a New Formation-Evaluation Tool With Three Ultrasonic Transducers", SPE Drilling & Completion, (Jun. 1995), 104-111.

European Application Serial No. 15886678.0; Extended European Search report; dated Jun. 19, 2018, 7 pages.

\* cited by examiner

FIG. 8

DRILLING FLUID PROPERTY DETERMINATION

CLAIM OF PRIORITY

This application is a U.S. National Stage Filing under 35 U.S.C. 371 of International Patent Application Serial No. PCT/US2015/063711, filed Dec. 3, 2015, which is a continuation-in-part of PCT Application Serial No. PCT/US2015/022729 and PCT Application Serial No. PCT/US2015/022748, both filed on 26 Mar. 2015, and hereinafter referred to as "the Priority Applications," which Priority Applications designated all PCT contracting states, and which Priority Applications are incorporated herein by reference in their entirety. This application is related to PCT Application Serial No. PCT/US2015/063693, titled "STANDOFF DETERMINATION," filed on Dec. 3, 2015, and to U.S. patent application Ser. No. 15/113,285, filed on Jul. 21, 2016.

BACKGROUND

Measurements made in a borehole may be used to identify the composition and distribution of material that surrounds the measurement device. However, the accuracy of the identification may depend on how precisely the tool can be located in the borehole. For example, the position of the tool is sometimes determined using a two-part process. In the first part, an ultrasonic transducer, also known to those of ordinary skill in the art as a mud transducer, is used to generate acoustic pulses that traverse separate paths, to determine ultrasonic velocity in the drilling fluid (or "mud"), using the time difference between the pulses upon traversing their respective path lengths. In the second part, the drilling fluid velocity defined by the mud transducer measurement can be used to determine the tool standoff in the borehole, using the time delay between pulse transmission and reception for a pitch-catch transducer.

However, the traditional ultrasonic tool may lack the capability to accurately determine drilling fluid density, which is assumed to be relatively constant during logging. For example, due to drilling fluid gravity and/or environmental changes, the drilling fluid density can vary, and the assumption is invalid. These variations can therefore lead to systematic standoff measurement errors.

DETAILED DESCRIPTION

Apparatus, systems, and methods are described herein that provide a new mechanism to more accurately measure drilling fluid density by combining ultrasonic logging with nuclear technology. Drilling fluid density is a useful parameter for ultrasonic logging to determine drilling fluid signal attenuation characteristics. Thus, improving the accuracy of the drilling fluid density measurement can in turn improve accuracy of cement impedance determination.

Some embodiments employ a nuclear X-ray array tool to determine drilling fluid density. By implementing an array of sensors, the accuracy is enhanced even more, so that drilling fluid density in the borehole environment can be determined with an accuracy of 0.1 g/cc in real time. Cement impedance determination improves in a corresponding fashion. The details of various embodiments will now be described.

In the far-field, the signal amplitude resulting from an ultrasonic transducer beam can be expressed as shown in Equation (1):

$$P(r, \theta) = \frac{P_o \omega}{j(\lambda)^{1/2}} e^{2j\pi r/\lambda} \frac{\sin(\pi \omega / \lambda \sin\theta)}{\pi \omega / \lambda \sin\theta} \cos\theta. \quad (1)$$

Here, r is the distance from the reflection point to the receiver (equivalent to the standoff distance), θ is the eccentricity angle, $P_o$ is the source signal amplitude in dB (e.g., generated by the transducer 210), ω is the inverse of the source operating frequency, and λ is the wavelength.

When ultrasonic waves propagate through the drilling fluid along different paths, the return signal amplitudes vary, due to beam spreading. Therefore, standoff measurement and correction is often implemented in the field, in the pursuit of better tool centralization. However, due to the non-ideal nature of the tool rotation process, it is difficult to centralize the tool position in the borehole. The resulting eccentricity also affects beam spreading.

Analysis of the reflected ultrasonic waveforms provides information about the acoustic impedance of the material immediately behind the casing. A cement map presents a visual indicator of cement quality. The current industry standard for cement impedance determination is +/−0.5 MegaRayls. To obtain this degree of accuracy, the acoustic impedance of the drilling fluid should be known to within five percent.

The acoustic impedance of the drilling fluid is provided, in part, by downhole fluid property measurements, which are usually acquired while tripping into the well. Thus, the drilling fluid velocity and density measurements are inverted to determine the drilling fluid impedance. Drilling fluid acoustic velocity may be measured by a mud cell transducer combined with an ultrasonic logging tool. However, drilling fluid density is not measured directly. Instead, the traditional approach assumes the drilling fluid density is constant—the same as it was before pouring into the well bore. However, due to changes in the environment, or the drilling fluid gravity, the drilling fluid density can also change. Because the determination of cement impedance is sensitive to the determined value of the drilling fluid impedance, a new approach that can more accurately determine the value of drilling fluid density is very useful. This approach will now be described in detail.

Figure 1:
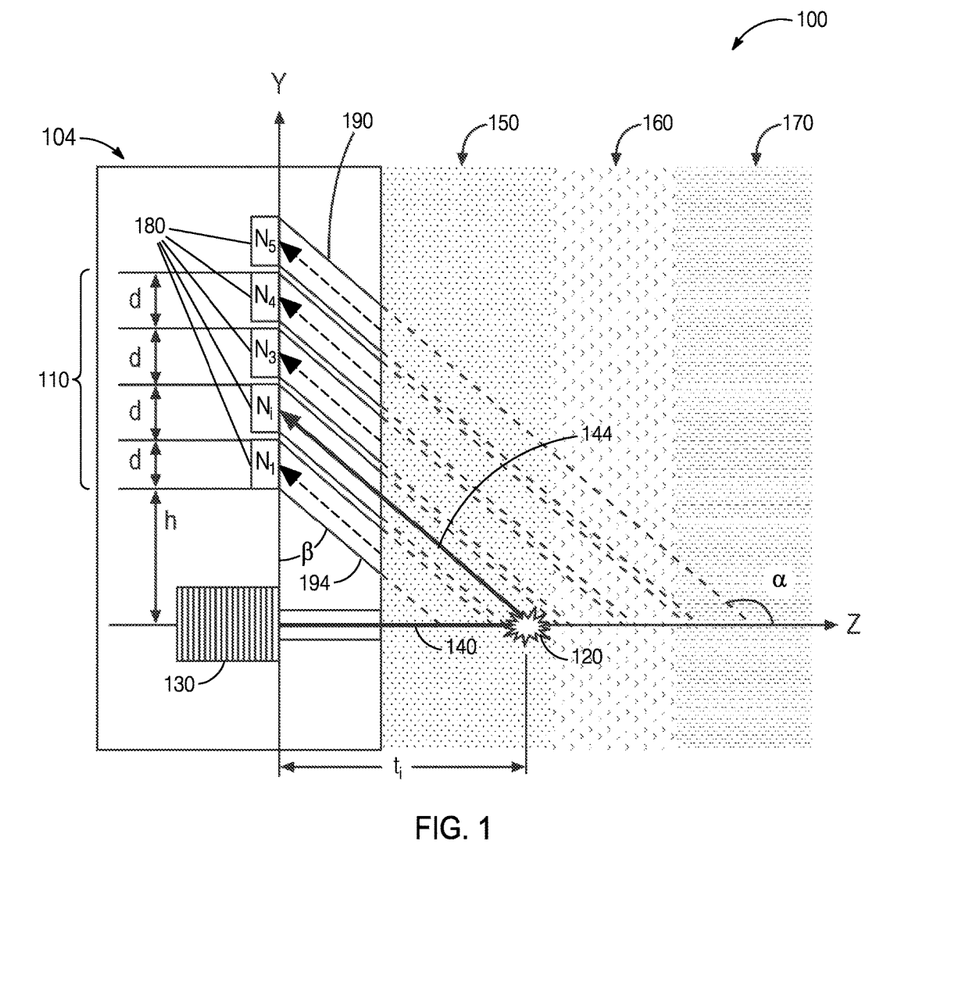
FIG. 1 illustrates standoff distance being determined by an apparatus comprising a nuclear logging tool, according to various embodiments.

FIG. 1 illustrates standoff distance being determined by an apparatus 100 comprising a nuclear logging tool, according to various embodiments. Here an array 110 of X-ray sensors are used to detect drilling fluid density. Multiple sensors align so that the tool can detect various radial depths. Compton backscattering events 120 resulting from the emission of photons through multiple material layers are used to predict the drilling fluid density.

Here the side, cut-away view of the tool housing 104 (e.g., a tubular member, such as a pipe) is seen to include a photon source 130 to project photons 140 into one or more materials 150, 160, 170. The source 130 thus emits photons at one or more energies or over broad range of energy and may comprise a chemical source Cs-137, induced gamma-rays from neutron activation, or an electronic source such as an X-ray tube, producing energy from 0-400 keV.

For example, a first material 150 might comprise drilling fluid, a second material 160 might comprise steel casing, and a third material 170 might comprise cement. The photons 144 that are redirected from the interaction between the original projection of photons 140 and the materials 150, 160, 170 are reflected to pixels in an array 110 of detectors 180, where the count rates at each pixel are substantially linearly proportional to the density of photons 144 at the measurement point. In some embodiments, a single detector 180 may serve as a single pixel.

The pixelated array 110 of photon detection devices may operate to produce scintillation light in response to receiving the redirected photons 144. Thus, the array 110 may comprise a gamma-ray scintillator in some embodiments.

The pixels that form the detectors 180 in the array 110 may also comprise photo-sensors, to produce an electrical signal in response to scintillation lights or photons. Thus, the array 110 may comprise a photomultiplier tube (PMT) or photodiodes. The pixels in the array 110 may also comprise semiconductor material.

The use of multiple pixelated sensors in the array 110, along with an angled collimator 190, permit the detection mechanism to operate over a range of radial depths, and defines the volume of investigation. The geometry of the collimator 190 is designed to accept the photons 144 with single Compton backscattering at a fixed angle α while substantially rejecting photons that arrive via multiple Compton scattering events. The collimator 190 may include an array of tubes 194 arranged at an angle β with respect to the plane of the array 110. The slanted-tube collimator design thus provides a one-dimensional (1-D) radial spectrum of the backscattered photons and rotation of the apparatus 100 can provide circumferential scans to create a two-dimensional (2-D) tomographic image of the borehole if desired.

Thus, as part of an apparatus 100, a housing 104 may be attached to, or wholly contain the source 130, the array 110, and/or the collimator 190. As shown in FIG. 1, the apparatus 100 may comprise an nuclear array logging tool in some embodiments.

As is known to those of ordinary skill in the art, Compton backscattering events 120 are the result of interaction between the emitted photons 140 and multiple layers of materials 150, 160, 170. In the figure, $N_i$ represents the number of detected photons in the $i^{th}$ detector element after Compton backscattering occurs at some distance $t_i$ from the reference point (i.e., the distance between the face of the source 130 and the detectors 180).

Thus, it can be seen that in some embodiments, the detector elements have the same height, d, and hence the distance $t_i$ increases according to the same increment, $$\frac{d}{\tan(\pi - \alpha)}.$$

The differences between $N_i$ and $N_{i+1}$ can be explained by photon interactions along the extended travel path presented by the travel path of the photons 140, 144. For example, $N_2$ (i.e., i=2) is approximately proportional to the function:

$$N_2 \propto$$
$$I_1 \times \left\{ \rho_{m1} \times \exp\left(-\mu_{m1}(E) \times \frac{d}{\tan(\pi - \alpha)}\right) \times \exp\left(-\mu_{m1}(E') \times \frac{d}{\sin(\pi - \alpha)}\right) \right\} \times$$
$$\exp\left(-\mu_{m1}(E') \times \frac{t_1}{\cos(\pi - \alpha)}\right)$$

assuming the intensity of incoming photon of energy E is $I_1$ at $t_1$, and that ρm1 and μm1 represent the density and linear attenuation coefficient of the first material 150, respectively. E' is readily calculated from the Compton equation when the initial photon energy and the scattering angle are known.

All Compton backscattering events are occurring in the same material in this case and $N_3$ can be given as approximately equal to the following function:

$$N_3 \propto$$
$$I_2 \times \left\{ \rho_{m1} \times \exp\left(-\mu_{m1}(E) \times \frac{d}{\tan(\pi - \alpha)}\right) \times \exp\left(-\mu_{m1}(E') \times \frac{d}{\sin(\pi - \alpha)}\right) \right\} \times$$
$$\exp\left(-\mu_{m1}(E') \times \frac{t_2}{\cos(\pi - \alpha)}\right) = I_1 \times \exp\left(-\mu_{m1}(E) \times \frac{d}{\tan(\pi - \alpha)}\right) \times$$
$$\left\{ \rho_{m1} \times \exp\left(-\mu_{m1}(E) \times \frac{d}{\tan(\pi - \alpha)}\right) \times \exp\left(-\mu_{m1}(E') \times \frac{d}{\sin(\pi - \alpha)}\right) \right\} \times$$
$$\exp\left(-\mu_{m1}(E') \times \frac{t_1}{\cos(\pi - \alpha)}\right) \times \exp\left(-\mu_{m1}(E') \times \frac{d}{\sin(\pi - \alpha)}\right)$$

Taking the ratio of $N_2$ to $N_3$, as expressed above, results in $$\frac{N_2}{N_3} = \exp\left(-\mu_{m1}(E) \times \frac{d}{\tan(\pi - \alpha)}\right) \times \exp\left(-\mu_{m1}(E') \times \frac{d}{\sin(\pi - \alpha)}\right)$$

The ratio of $N_2$ to $N_3$ becomes a constant as long as each results from Compton backscattering events within the same material, and can be generalized to the expression shown in Equation (2):

$$\frac{N_i}{N_{i+1}} = \exp\left(-\mu_{m1}(E) \times \frac{d}{\tan(\pi - \alpha)}\right) \times \exp\left(-\mu_{m1}(E') \times \frac{d}{\sin(\pi - \alpha)}\right) \quad (2)$$
$$= \text{constant} = C_1$$

where $C_1$ is determined by the property of the first material 150. If there is a transition from one material (e.g. the first material 150) to another (e.g., the second material 160), which involves the path distances $N_4$ and $N_5$, the variables in Equation (2) can be rearranged as shown in Equation (3):

$$\frac{N_i}{N_{i+1}} = \frac{\rho_{m1}}{\rho_{m2}} \times \exp\left(-\mu_{m2}(E) \times \frac{d}{\tan(\pi - \alpha)}\right) \times \quad (3)$$

-continued $$\exp\left(-\mu_{m2}(E') \times \frac{d}{\sin(\pi - \alpha)}\right) = \frac{\rho_{m1}}{\rho_{m2}} \times \text{constant}$$

$$= \frac{\rho_{m1}}{\rho_{m2}} \times C_2 = D_1$$

where the value of $C_2$ is determined by the property of the second material 160.

In the case of an X-ray tube source, the mean energy of the photon spectrum can be used and Equations (2) and (3) can be replaced by Equations (4) and (5), respectively.

$$\frac{N_i}{N_{i+1}} = \exp\left(-\mu_{m1}(\overline{E}) \times \frac{d}{\tan(\pi - \alpha)}\right) \times \exp\left(-\mu_{m1}(\overline{E'}) \times \frac{d}{\sin(\pi - \alpha)}\right) = C_1 \quad (4)$$

$$\frac{N_i}{N_{i+1}} = \frac{\rho_{m1}}{\rho_{m2}} \times \exp\left(-\mu_{m2}(\overline{E}) \times \frac{d}{\tan(\pi - \alpha)}\right) \times \quad (5)$$

$$\exp\left(-\mu_{m2}(\overline{E'}) \times \frac{d}{\sin(\pi - \alpha)}\right) = \frac{\rho_{m1}}{\rho_{m2}} \times C_2 = D_1$$

For a given detector geometry, the distance to a boundary is simply given by $$\frac{H}{\tan(\pi - \alpha)},$$

where H is the height of the detector element whose ratio value corresponds to either a valley (minimal value) or a peak (maximal value). The uncertainty of the determined distance is $$\pm \frac{d/2}{\tan(\pi - \alpha)}$$

and accuracy on the order of a millimeter can be achieved when a semiconductor photon detector array 110, with a pixel size on the order of a millimeter or less, is used along with a collimator 190 of comparable dimensions. Finally, the density of the materials, such as the first material 150 (e.g., drilling fluid, or "mud") can be deduced from the ratio $$\frac{D_1}{C_2}$$

in a cased-hole since the density of the second material 160 (e.g. steel casing, having a density of ρm2) is known.

Moreover, the ratio between the value of $N_i$ for adjacent detectors can be calculated, so dramatic changes in the ratio may be used to indicate when the photons 140, 144 cross a layer (material) boundary. Therefore changes in the ratio for adjacent detectors 180 can be used to detect the thickness of each material (e.g., drilling fluid or casing). Thus, the standoff determination using the source 130 is a one-time measurement, different from that obtained using traditional measurements with an ultrasonic mud cell transducer.

Figure 2:
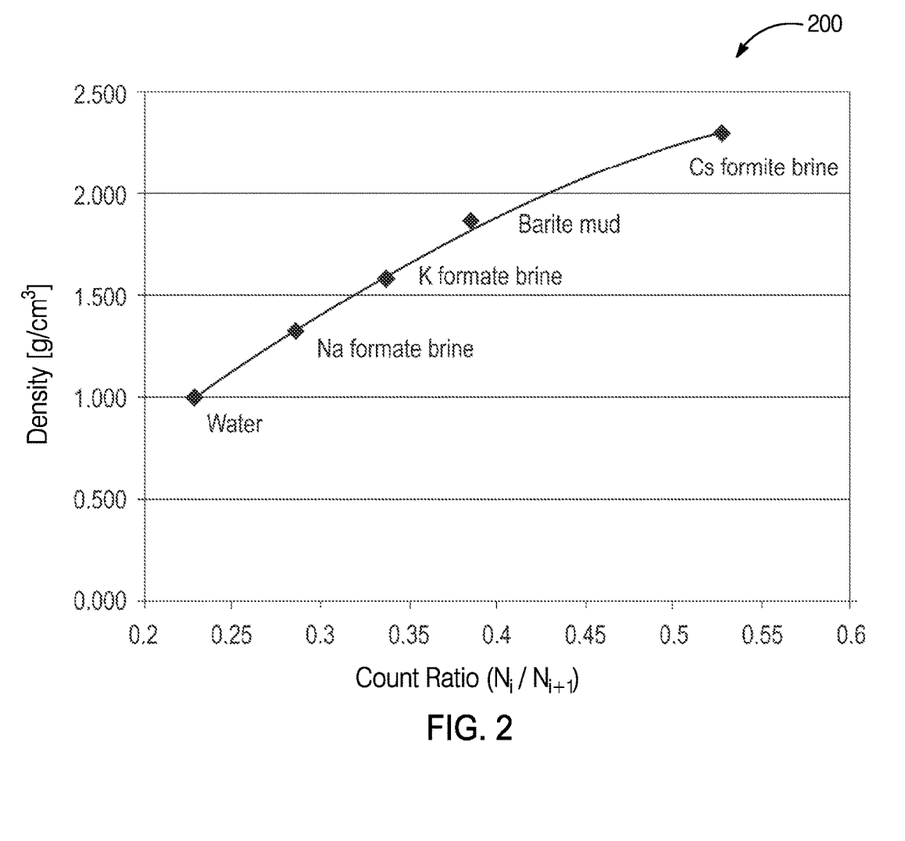
FIG. 2 is a graph illustrating the construction of a look-up table for the nuclear logging tool of FIG. 1.

FIG. 2 is a graph 200 illustrating the construction of a look-up table for the nuclear logging tool of FIG. 1. Here the ratios of received photo counts are used to invert drilling fluid density, to form a density look-up table for an array nuclear logging tool. Thus, when the count ratio $N_i/N_{i+1}$ is known, as shown in the horizontal axis, the drilling fluid density can be inferred from the vertical axis of the graph 200.

Figure 3:
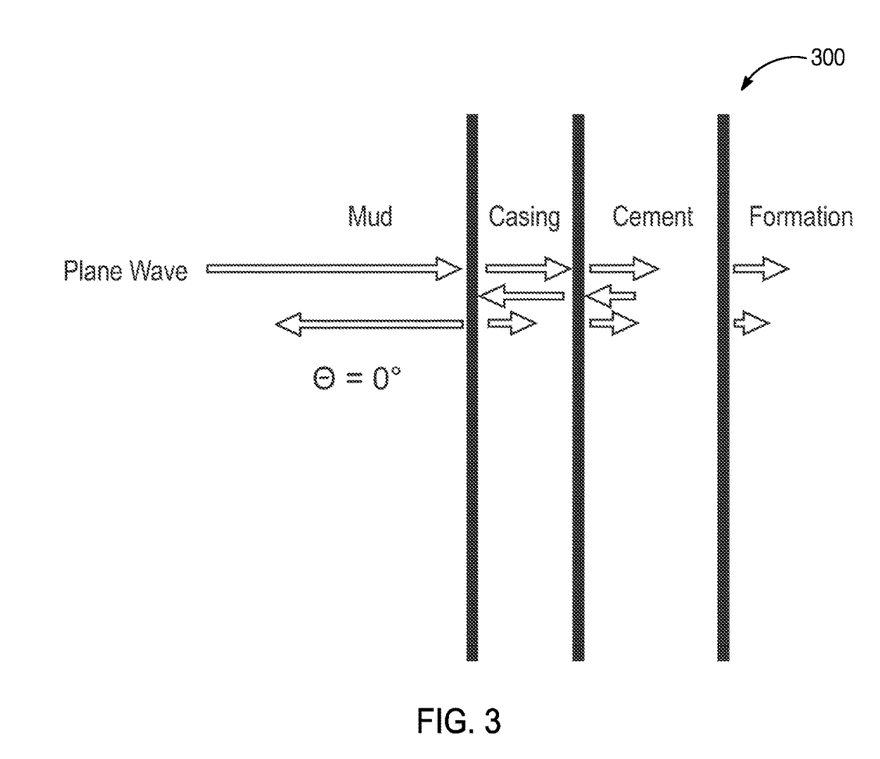
FIG. 3 illustrates a plane wave model, according to various embodiments.

FIG. 3 illustrates a plane wave model 300, according to various embodiments. In this case, a synthetic, four layer plane wave model is presented as the basis for inverting drilling fluid density, to provide a value for cement impedance. The layers include: drilling fluid, casing, cement, and the formation behind the casing. Plane wave theory is employed to simulate wave propagation through each of the layers, and back again.

Figure 4:
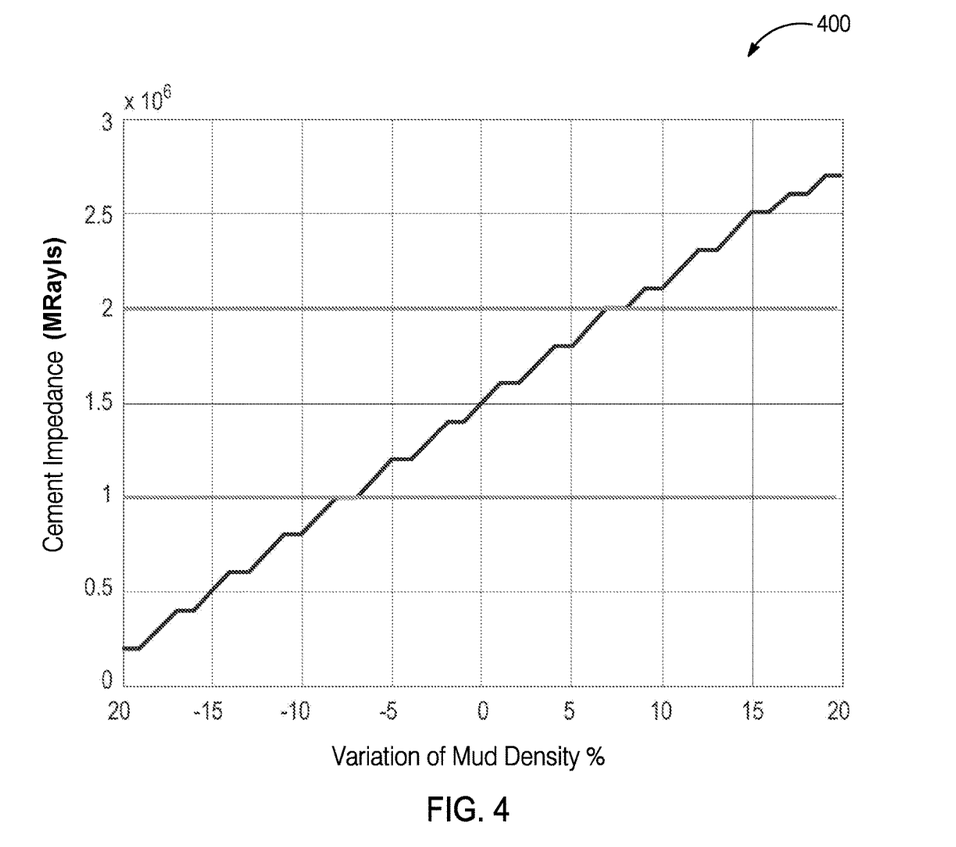
FIG. 4 is a graph of inverted cement impedance according to drilling fluid density variation, according to various embodiments.

FIG. 4 is a graph 400 of inverted cement impedance according to drilling fluid density variation, according to various embodiments. Here the sensitivity of cement impedance value to variations in drilling fluid density is clearly demonstrated. Indeed, it is apparent that variations of 10% in drilling fluid density value can cause greater than +/−0.5 MegaRayls change in the cement density, exceeding the error limits tolerated within the industry. However, when the apparatus (e.g., an X-ray array tool) shown in FIG. 1 is used as described herein, drilling fluid density can be measured more accurately—perhaps with a resolution of up to 0.1 g/cc. Thus, when this apparatus is applied, the accuracy of the cement impedance determination is improved, to meet or exceed the +/−0.5 MegaRayls industry standard, especially for heavy drilling fluid, with densities that are great than 10 ppg.

Figure 5:
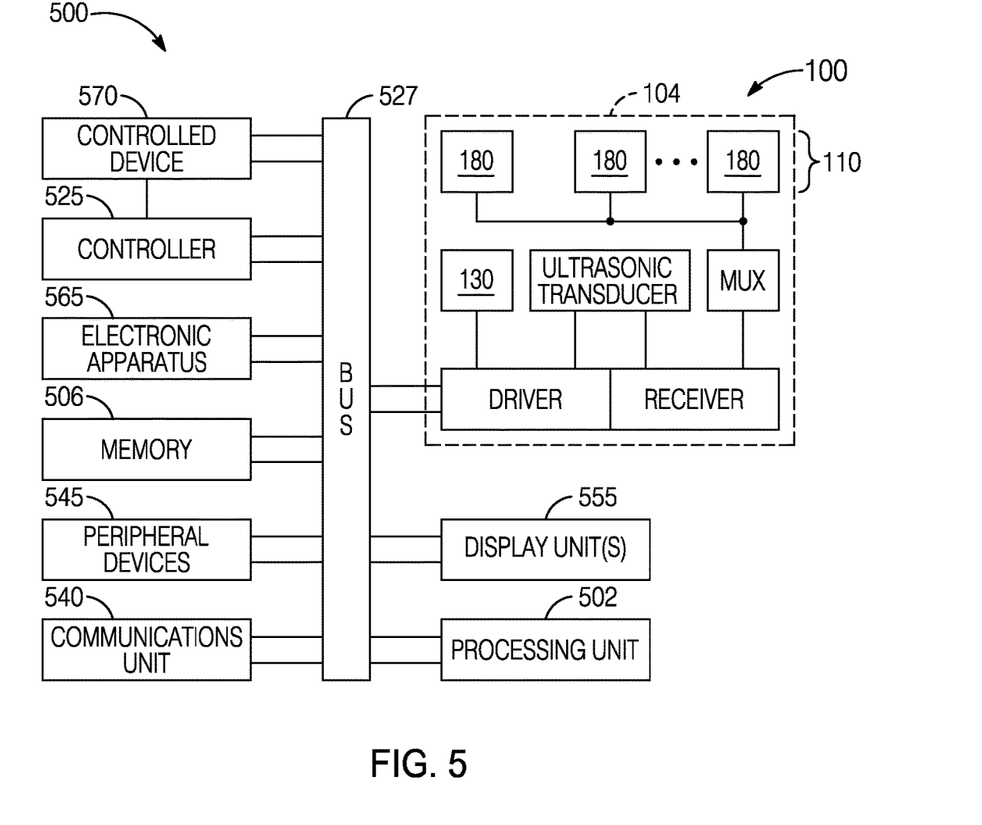
FIG. 5 is a block diagram of apparatus and systems according to various embodiments.

FIG. 5 is a block diagram of apparatus 100 and systems 500 according to various embodiments. Here, it can be seen that the system 500 may include a controller 525 specifically designed to interface with a controlled device 570, such as an ultrasonic tool, a nuclear array logging tool, a geosteering unit, and/or a user display or touch screen interface (in addition to displays 555). The system 500 may further include sources and sensors, such as electromagnetic transmitters and receivers, transducers, an energy source 130, an array of detectors 180, etc. attached to a tool housing 104, forming part of an apparatus 100. When configured in this manner, the system 500 can receive measurements and other data (e.g., location information, standoff information, among other data) to be processed according to various methods described herein.

For the purposes of this document, the term "attached" includes the meaning of the phrase "directly attached", wherein named elements, such as the energy source 130, detectors 180, etc. are attached directly to the tool housing 104, without intervening structural components. The term "attached" also includes the meaning of the phrase "indirectly attached", wherein named elements, such as the energy source 130, detectors 180, etc. are attached indirectly to the tool housing 104, with one or more structural elements (e.g., a mounting plate or extension arm) interposed between and serving to couple one or more surfaces of the, e.g., energy source 130, detectors 180, etc. to one or more surfaces of the housing 104.

A processing unit 502 can be coupled to the apparatus 100 to obtain measurements from the array 110, and other components that may be attached to a housing 104. Thus, in some embodiments, a system 500 comprises a housing 104 that can be attached to or used to house the apparatus 100, and perhaps the controlled device 570, and one or more ultrasonic transducers, among other elements. The housing 104 might take the form of a wireline tool body, or a downhole tool as described in more detail below with reference to FIGS. 7 and 8. The processing unit 502 may be part of a surface workstation, or attached to the housing 508.

The system 500 can include other electronic apparatus 565, and a communications unit 540. Electronic apparatus 565 (e.g., electromagnetic sensors, current sensors, transducers, and other devices) can also be used in conjunction with the controller 525 to perform tasks associated with taking measurements downhole. The communications unit 540 can be used to handle downhole communications in a drilling operation. Such downhole communications can include telemetry.

The system 500 can also include a bus 527 to provide common electrical signal paths between the components of the system 500. The bus 527 can include an address bus, a data bus, and a control bus, each independently configured. The bus 527 can also use common conductive lines for providing one or more of address, data, or control, the use of which can be regulated by the controller 525 and/or the processing unit 502.

The bus 527 can include instrumentality for a communication network. The bus 527 can be configured such that the components of the system 500 are distributed. Such distribution can be arranged between downhole components such as the components attached to the housing 104, and components that are located on the surface of a well. Alternatively, several of these components can be co-located, such as on one or more collars of a drill string or on a wireline structure.

In various embodiments, the system 500 includes peripheral devices that can include displays 555, additional storage memory, or other control devices that may operate in conjunction with the controller 525 or the processing unit 502. The displays 555 can display diagnostic and measurement information for the system 500, based on the signals generated according to embodiments described above.

In an embodiment, the controller 525 can be fabricated to include one or more processors. The display 555 can be fabricated or programmed to operate with instructions stored in the processing unit 502 (for example in the memory 506) to implement a user interface to manage the operation of the system 500, including any one or more components distributed within the system 500. This type of user interface can be operated in conjunction with the communications unit 540 and the bus 527. Various components of the system 500 can be integrated with a bottom hole assembly, if desired, which may in turn be used to house the apparatus 100, such that operation of the apparatus 100, and processing of the measurement data, identical to or similar to the methods discussed previously, and those that follow, can be conducted according to various embodiments that are described herein.

In some embodiments, a non-transitory machine-readable storage device can comprise instructions stored thereon, which, when performed by a machine, cause the machine to become a customized, particular machine that performs operations comprising one or more features similar to or identical to those described with respect to the methods and techniques described herein. A machine-readable storage device, as described herein, is a physical device that stores information (e.g., instructions, data), which when stored, alters the physical structure of the device. Examples of machine-readable storage devices can include, but are not limited to, memory 506 in the form of read only memory (ROM), random access memory (RAM), a magnetic disk storage device, an optical storage device, a flash memory, and other electronic, magnetic, or optical memory devices, including combinations thereof.

The physical structure of stored instructions may be operated on by one or more processors such as, for example, the processing unit 502. Operating on these physical structures can cause the machine to become a specialized machine that performs operations according to methods described herein. The instructions can include instructions to cause the processing unit 502 to store associated data or other data in the memory 506. The memory 506 can store the results of measurements of formation parameters, to include gain parameters, calibration constants, identification data, sensor location information, cement density look-up table information (e.g., as provided in FIG. 2), etc. The memory 506 can store a log of the measurement and location information provided by the system 500. The memory 506 therefore may include a database, for example a relational database. The processors 530 can be used to process the data 574 to form images of the casing or cement surrounding a well, as well as the formation itself.

Thus, referring to FIGS. 1-5, it can be seen that many embodiments may be realized. For example, an apparatus 100 may comprise a housing 104, perhaps taking the form of a tool housing (e.g., a tubular member, such as a pipe), with an attached array of detectors 180 and an attached processing unit 502 that are used to determine acoustic impedance of the drilling fluid via photon activity.

In some embodiments, an apparatus 100 comprises a tool housing (e.g., as a specific form of the housing 104) and an array 110 of detectors 180 attached to the tool housing and mechanically coupled to an angled collimator 190 to determine density of drilling fluid associated with photon activity in the drilling fluid. The apparatus 100 may further comprise a processing unit 502 attached to the tool housing, the processing unit 502 to determine acoustic impedance of the drilling fluid as a combination of the density and acoustic velocity in the drilling fluid.

The tool housing may comprise wireline or drilling elements. Thus, in some embodiments, the tool housing comprises one of a drilling collar or an array nuclear logging tool.

X-ray detectors may be used to determine the amount of photon activity. Thus, in some embodiments, the array 110 of detectors 180 comprises an array of X-ray detectors.

The array may be arranged in a linear fashion. Thus, in some embodiments, the array 110 of detectors 180 comprises a substantially linear arrangement of detector elements.

The angled collimator may include an array of tubes oriented at the same angle to the array of detectors. Thus, in some embodiments, the angled collimator 190 comprises an array of tubes 194 to direct photons 140, 144 engaged in the photon activity from the drilling fluid to the array 110 of detectors 180, wherein each of the tubes 194 are disposed at a substantially similar angle β to a plane comprising the array 110 of detectors 180.

The angled collimator may provide different (known) travel path lengths for the photons, through the drilling fluid. Thus, in some embodiments, the tubes 194 are arranged so that the substantially similar angle β provides a plurality of travel path lengths from a source 130 of energy that generates photons 140, 144 engaged in the photon activity.

The apparatus may include a source of energy, to generate photons in the drilling fluid. Thus, some embodiments of the apparatus 100 include a source 130 of energy comprising an X-ray tube to direct the energy into the drilling fluid, to generate the photon activity.

The apparatus may include a lookup table in memory, to associate photon activity with drilling fluid density. Thus, in some embodiments, the apparatus 100 comprises a memory 506 having a lookup table stored therein, the lookup table comprising information associating the photon activity with the density, as illustrated in the graph 200 of FIG. 2.

Some embodiments comprise a system 500 that includes an array 110 of detectors 180 attached to a tool housing (e.g., the housing 104), an ultrasonic transducer, and a processing unit 502 (which may be located down hole or one the Earth's surface) to determine the acoustic impedance of the drilling fluid.

In some embodiments, a system 500 comprises a tool housing (e.g., a tubular member as a form of the housing 104), and an array 110 of detectors 180 attached to the tool housing and mechanically coupled to a collimator 190 to determine density of drilling fluid associated with photon activity in the drilling fluid. Some embodiments of the system 500 comprise an ultrasonic transducer to measure acoustic velocity in the drilling fluid, as well as a processing unit 502 to determine acoustic impedance of the drilling fluid as a combination of the density and the acoustic velocity.

The system may comprise an ultrasonic tool, enhanced by an array of X-ray detectors. Thus, in some embodiments, the tool housing comprises an ultrasonic logging tool, wherein the ultrasonic transducer comprises a mud transducer.

The system may comprise a wireline system or a drilling system. Thus, in some embodiments, the tool housing comprises one of a wireline tool or a drilling tool.

The system may include a processing unit located downhole, or at the surface, to assist with acoustic impedance determination. Thus in some embodiments, the processing unit 502 is located remotely from the tool housing, at the surface of the Earth.

The apparatus 100, system 500, and each of their elements may all be characterized as "modules" herein. Such modules may include hardware circuitry, and/or a processor and/or memory circuits, software program modules and objects, and/or firmware, and combinations thereof, as desired by the architect of the apparatus 100 and systems 500, and as appropriate for particular implementations of various embodiments. For example, in some embodiments, such modules may be included in an apparatus 100 and/or system 500 operation simulation package, such as a software electrical signal simulation package, a power usage and distribution simulation package, a power/heat dissipation simulation package, a formation imaging package, an energy detection and measurement package, and/or a combination of software and hardware used to simulate the operation of various potential embodiments.

It should also be understood that the apparatus 100 and systems 500 of various embodiments can be used in applications other than for logging operations, and thus, various embodiments are not to be so limited. The illustrations of apparatus 100 and systems 500 are intended to provide a general understanding of the structure of various embodiments, and they are not intended to serve as a complete description of all the elements and features of apparatus and systems that might make use of the structures described herein.

Applications that may include the novel apparatus and systems of various embodiments include electronic circuitry used in high-speed computers, communication and signal processing circuitry, modems, processor modules, embedded processors, data switches, and application-specific modules. Such apparatus and systems may further be included as sub-components within a variety of electronic systems, such as televisions, cellular telephones, personal computers, workstations, radios, vehicles, geothermal tools, and smart transducer interface node telemetry systems, among others. Some embodiments include a number of methods.

Figure 6:
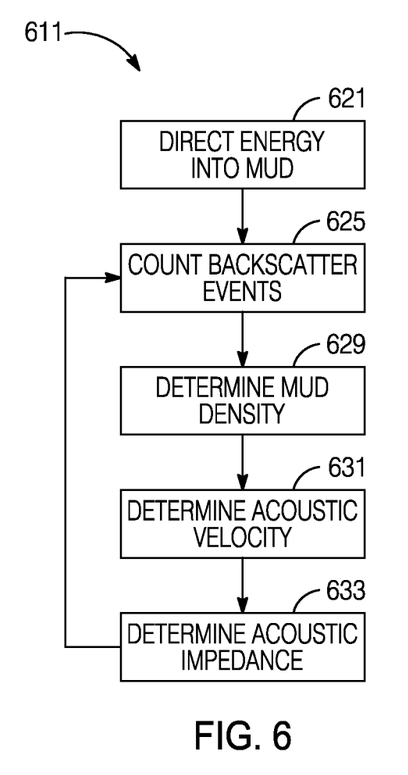
FIG. 6 is a flow chart illustrating several methods according to various embodiments.

For example, FIG. 6 is a flow chart illustrating several methods 611 according to various embodiments. The methods 611 may comprise processor-implemented methods, to execute on one or more processors that perform the methods. For example, one embodiment of a method 611 may begin at block 629 with determining drilling fluid density, and then determining the acoustic impedance of the drilling fluid at block 633, based on the drilling fluid density.

X-ray energy can be directed into fluid in the borehole, such as drilling fluid, to generate photons. Thus, in some embodiments, a method 611 begins at block 621 with directing energy comprising X-rays, using a source of the energy attached to a nuclear tool, into drilling fluid downhole.

The level of Compton backscatter can be used to determine the level of photon activity. Thus, in some embodiments, the method 611 continues on to block 625 to comprise measuring the photon activity by counting Compton backscattering events. That is, the activity at block 625 may include counting Compton backscattering events associated with photons created by the interaction of the energy and the drilling fluid, wherein the events are monitored along an angle to an array of detectors (e.g., using an angled collimator).

In some embodiments, the method 611 continues on to block 629 with determining the density of the drilling fluid associated with photon activity in the drilling fluid using the array of detectors. For example, drilling fluid density can be determined along a plurality of photon travel path lengths. Thus, in some embodiments, the activity at block 629 comprises determining a plurality of densities of a corresponding plurality of photon travel path lengths determined by an angled collimator mechanically coupled to the array of detectors.

Drilling fluid density can also be determined according to an average of photon travel path lengths. Thus in some embodiments, the activity at block 629 comprises averaging a plurality of densities of a corresponding plurality of photon travel path lengths determined by an angled collimator mechanically coupled to the array of detectors.

A lookup table can also be used to determine the drilling fluid density. Thus, in some embodiments, the activity at block 629 comprises accessing a lookup table to determine the density associated with a ratio of the photon activity.

After the drilling fluid density is determined, the acoustic velocity (in the drilling fluid) can be determined using an ultrasonic transducer. Thus, some embodiments of the method 611 continue on to block 631 to include determining the acoustic velocity in the drilling fluid using an ultrasonic transducer.

In some embodiment, the method 611 continues on to block 633 to include determining the acoustic impedance of the drilling fluid as a combination of the drilling fluid density and acoustic velocity (in the drilling fluid).

The density and acoustic velocity can be inverted to determine the acoustic impedance. Thus, in some embodiments, the activity at block 633 comprises inverting the density and the acoustic velocity to provide the acoustic impedance. The method 611 may go on to include repeating any one or more of the activities set forth with respect to blocks 621, 625, 629, 631, and 633.

It should be noted that the methods described herein do not have to be executed in the order described, or in any particular order. Moreover, various activities described with respect to the methods identified herein can be executed in iterative, serial, or parallel fashion. The various elements of each method (e.g., the methods shown in FIG. 6) can be substituted, one for another, within and between methods. Information, including parameters, commands, operands, and other data, can be sent and received in the form of one or more carrier waves.

Upon reading and comprehending the content of this disclosure, one of ordinary skill in the art will understand the manner in which a software program can be launched from a computer-readable medium in a computer-based system to execute the functions defined in the software program. One of ordinary skill in the art will further understand the various programming languages that may be employed to create one or more software programs designed to implement and perform the methods disclosed herein.

For example, the programs may be structured in an object-orientated format using an object-oriented language such as Java or C#. In another example, the programs can be structured in a procedure-orientated format using a procedural language, such as assembly or C. The software components may communicate using any of a number of mechanisms well known to those of ordinary skill in the art, such as application program interfaces or interprocess communication techniques, including remote procedure calls. The teachings of various embodiments are not limited to any particular programming language or environment. Thus, other embodiments may be realized.

Figure 7:
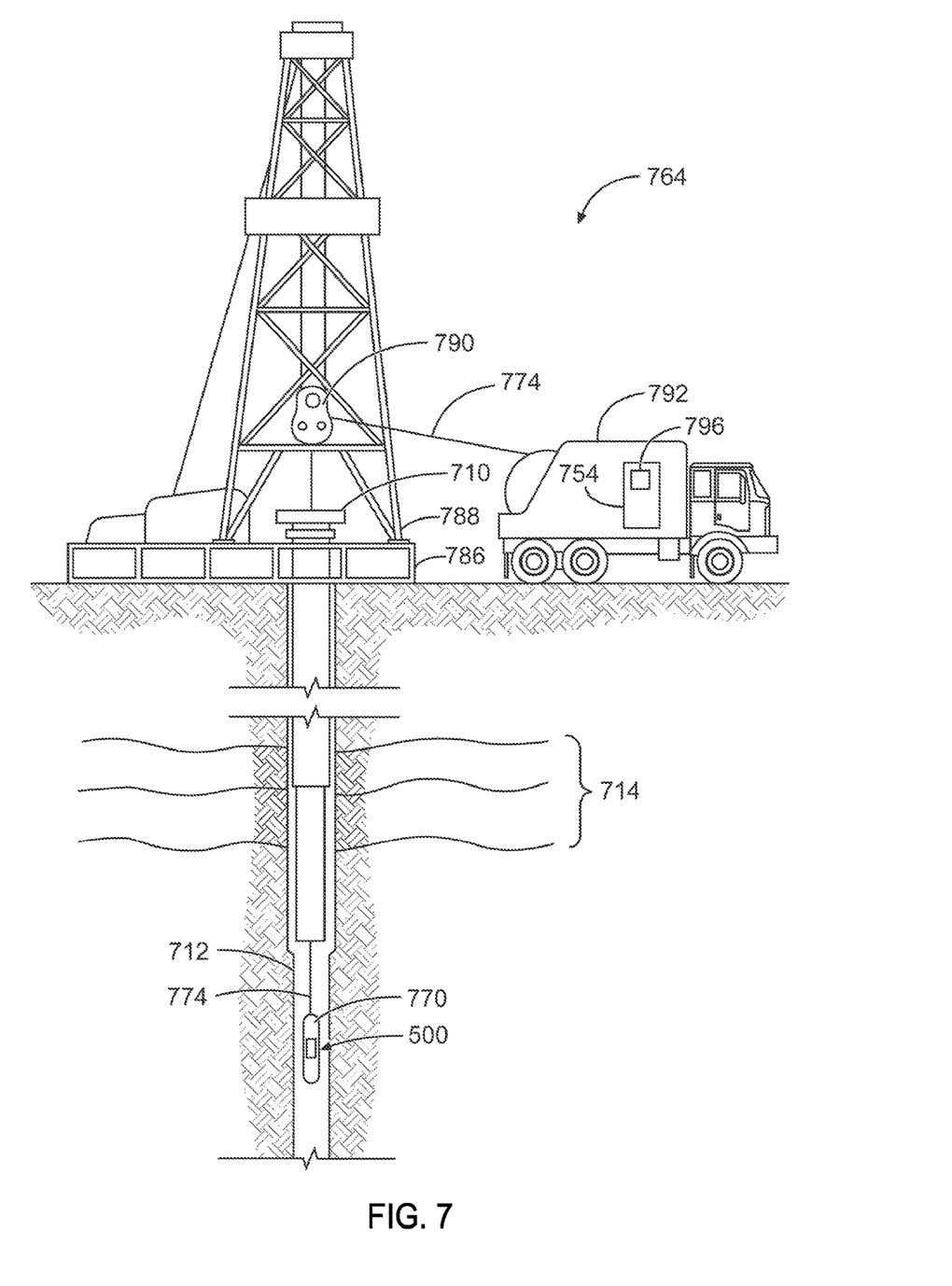
FIG. 7 illustrates a wireline system, according to various embodiments.
Figure 8:
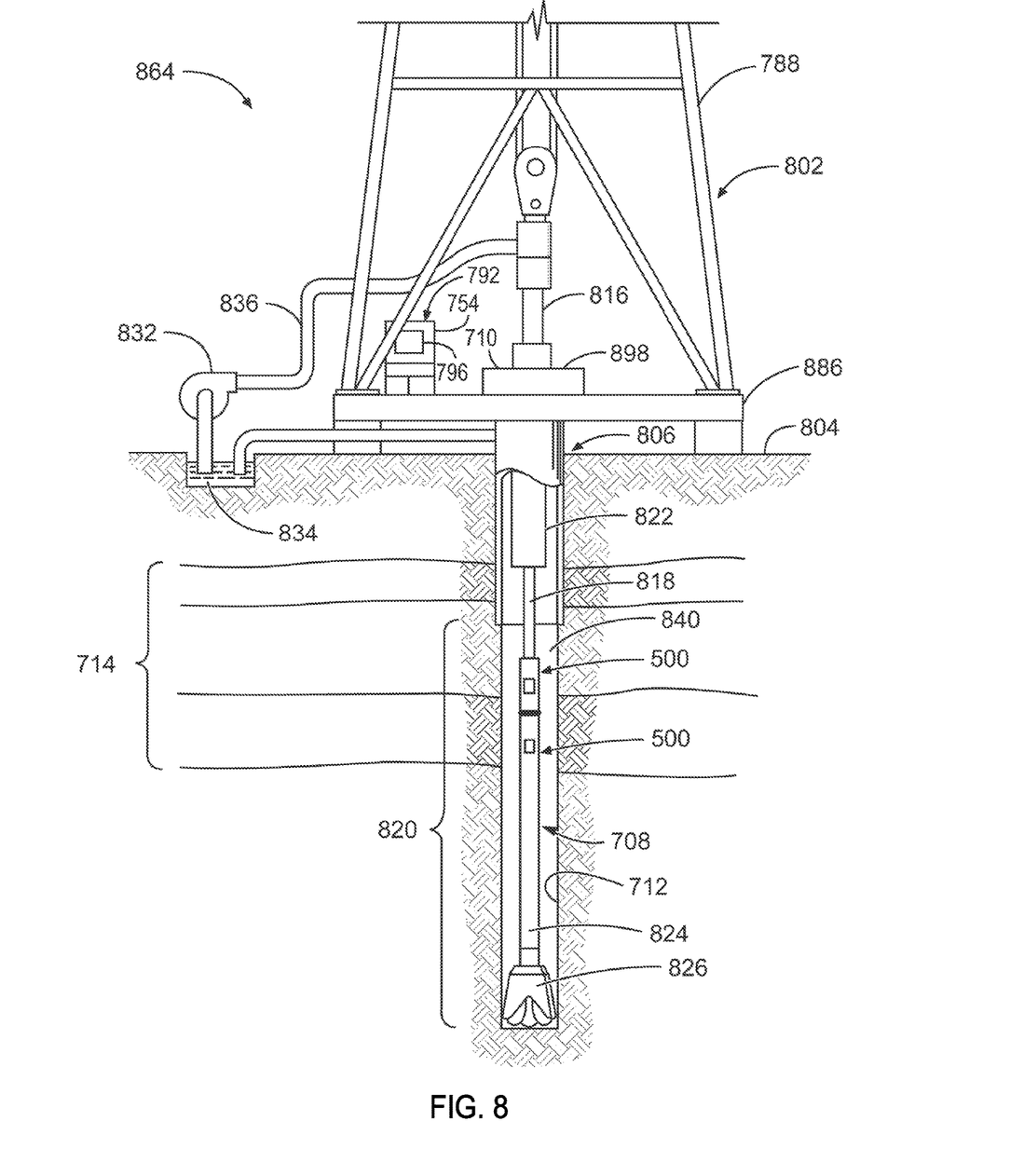
FIG. 8 illustrates a drilling rig system, according to various embodiments.

For example, FIG. 7 illustrates a wireline system 764, according to various embodiments. FIG. 8 illustrates a drilling rig system 864, according to various embodiments. Therefore, the systems 764, 864 may comprise portions of a wireline logging tool body 770 as part of a wireline logging operation, or of a downhole tool 824 as part of a downhole drilling operation. The systems 764 and 864 may include any one or more elements of the apparatus 100 and systems 500 shown in FIGS. 1-8.

Thus, FIG. 7 shows a well during wireline logging operations. In this case, a drilling platform 786 is equipped with a derrick 788 that supports a hoist 790.

Drilling oil and gas wells is commonly carried out using a string of drill pipes connected together so as to form a drilling string that is lowered through a rotary table 710 into a wellbore or borehole 712. Here it is assumed that the drilling string has been temporarily removed from the borehole 712 to allow a wireline logging tool body 770, such as a probe or sonde, to be lowered by wireline or logging cable 774 into the borehole 712. Typically, the wireline logging tool body 770 is lowered to the bottom of the region of interest and subsequently pulled upward at a substantially constant speed.

During the upward trip, at a series of depths, various instruments included in the tool body 770 may be used to perform measurements (e.g., made by sensors, such as the array 110 attached to a housing 104 shown in FIG. 1), on the subsurface geological formations 714 adjacent the borehole 712 (and the tool body 770). The borehole 712 may represent one or more offset wells, or a target well.

The measurement data can be communicated to a surface logging facility 792 for processing, analysis, and/or storage. The logging facility 792 may be provided with electronic equipment for various types of signal processing, which may be implemented by any one or more of the components of the system 500 in FIG. 5. Similar formation evaluation data may be gathered and analyzed during drilling operations (e.g., during logging while drilling operations, and by extension, sampling while drilling).

In some embodiments, the tool body 770 is suspended in the wellbore by a wireline cable 774 that connects the tool to a surface control unit (e.g., comprising a workstation 754). The tool may be deployed in the borehole 712 on coiled tubing, jointed drill pipe, hard wired drill pipe, or any other suitable deployment technique.

Turning now to FIG. 8, it can be seen how a system 864 may also form a portion of a drilling rig 802 located at the surface 804 of a well 806. The drilling rig 802 may provide support for a drill string 808. The drill string 808 may operate to penetrate the rotary table 710 for drilling the borehole 712 through the subsurface formations 714. The drill string 808 may include a Kelly 816, drill pipe 818, and a bottom hole assembly 820, perhaps located at the lower portion of the drill pipe 818.

The bottom hole assembly 820 may include drill collars 822, a downhole tool 824, and a drill bit 826. The drill bit 826 may operate to create the borehole 712 by penetrating the surface 804 and the subsurface formations 714. The downhole tool 824 may comprise any of a number of different types of tools including measurement while drilling (MWD) tools, logging while drilling (LWD) tools, and others.

During drilling operations, the drill string 808 (perhaps including the Kelly 816, the drill pipe 818, and the bottom hole assembly 820) may be rotated by the rotary table 710. Although not shown, in addition to, or alternatively, the bottom hole assembly 820 may also be rotated by a motor (e.g., a mud motor) that is located downhole. The drill collars 822 may be used to add weight to the drill bit 826. The drill collars 822 may also operate to stiffen the bottom hole assembly 820, allowing the bottom hole assembly 820 to transfer the added weight to the drill bit 826, and in turn, to assist the drill bit 826 in penetrating the surface 804 and subsurface formations 714.

During drilling operations, a mud pump 832 may pump drilling fluid (also known by those of ordinary skill in the art as "mud") from a mud pit 834 through a hose 836 into the drill pipe 818 and down to the drill bit 826. The drilling fluid can flow out from the drill bit 826 and be returned to the surface 804 through an annular area between the drill pipe 818 and the sides of the borehole 712. The drilling fluid may then be returned to the mud pit 834, where such fluid is filtered. In some embodiments, the drilling fluid can be used to cool the drill bit 826, as well as to provide lubrication for the drill bit 826 during drilling operations. Additionally, the drilling fluid may be used to remove subsurface formation cuttings created by operating the drill bit 826.

In light of the foregoing discussion, it may be seen that in some embodiments, the system 864 may include a drill collar 822 and/or a downhole tool 824 to house one or more systems 500, including some or all of the components thereof. Thus, for the purposes of this document, the term "housing" may include any one or more of a tool housing, such as a drill collar 822 or a downhole tool 824 (each having an outer wall, to enclose or attach to magnetometers, sensor arrays, transducers, photon detectors, fluid sampling devices, pressure measurement devices, transmitters, receivers, fiber optic cable, acquisition and processing logic, and data acquisition systems, and the like). Many embodiments may thus be realized.

Thus, referring now to FIGS. 1-8, it may be seen that in some embodiments, the systems 764, 864 may include a tool housing, such as a drill collar 822, as part a downhole tool 824, and/or a wireline logging tool body 770 to house one or more apparatus 100, similar to or identical to the apparatus 100 described above and illustrated in the figures. Any and all components of the system 500 shown in FIG. 5 may also be housed by the tool 824 or the tool body 770.

The tool 824 may comprise a downhole tool, such as an LWD tool or an MWD tool. The wireline tool body 770 may comprise a wireline logging tool, including a probe or sonde, for example, coupled to a logging cable 774. Many embodiments may thus be realized, and a non-limiting list of some of them follows.

In some embodiments, an apparatus comprises a tool housing; an array of detectors attached to the tool housing and mechanically coupled to an angled collimator to determine density of drilling fluid associated with photon activity in the drilling fluid; and a processing unit attached to the tool housing, the processing unit to determine the acoustic impedance of the drilling fluid as a combination of the density and acoustic velocity in the drilling fluid. In some embodiments, the tool housing comprises one of a drilling collar or an array nuclear logging tool.

In some embodiments, the array of detectors comprises an array of X-ray detectors. In some embodiments, the array of detectors comprises a substantially linear arrangement of detector elements.

In some embodiments, the angled collimator comprises an array of tubes to direct photons engaged in the photon activity from the drilling fluid to the array of detectors, and wherein each of the tubes are disposed at a substantially similar angle to a plane comprising the array of detectors. In some embodiments, the tubes are arranged so that the substantially similar angle provides a plurality of travel path lengths from a source of energy that generates photons engaged in the photon activity.

In some embodiments, the apparatus comprises a source of energy that includes an X-ray tube to direct the energy into the drilling fluid, to generate the photon activity.

In some embodiments, the apparatus comprises a memory having a lookup table stored therein, the lookup table to include information associating the photon activity with the density.

In some embodiments, a system comprises a tool housing; an array of detectors attached to the tool housing and mechanically coupled to a collimator to determine density of drilling fluid associated with photon activity in the drilling fluid; an ultrasonic transducer to measure acoustic velocity in the drilling fluid; and a processing unit to determine acoustic impedance of the drilling fluid as a combination of the density and the acoustic velocity.

In some embodiments, the tool housing comprises an ultrasonic logging tool, and the ultrasonic transducer comprises a mud transducer. In some embodiments, the tool housing comprises a wireline tool or a drilling tool, among others.

In some embodiments, the processing unit is located downhole, attached to the tool housing. In some embodiments, the processing unit is located remotely from the tool housing, at the surface of the Earth.

In some embodiments, a method comprises determining the density of drilling fluid associated with photon activity in the drilling fluid using an array of detectors; and determining the acoustic impedance of the drilling fluid as a combination of the density and acoustic velocity.

In some embodiments, the method includes directing energy comprising X-rays into the drilling fluid; and counting Compton backscattering events associated with photons created by interaction of the energy and the drilling fluid, wherein the events are monitored along an angle to the array of detectors.

In some embodiments, the method comprises measuring the photon activity by counting Compton backscattering events. In some embodiments, the method comprises determining the acoustic velocity using an ultrasonic transducer.

In some embodiments, determining the acoustic impedance further comprises inverting the density and the acoustic velocity to provide the acoustic impedance.

In some embodiments, determining the density further comprises determining a plurality of densities of a corresponding plurality of photon travel path lengths determined by an angled collimator mechanically coupled to the array of detectors.

In some embodiments, determining the density further comprises averaging a plurality of densities of a corresponding plurality of photon travel path lengths determined by an angled collimator mechanically coupled to the array of detectors.

In some embodiments, determining the density further comprises accessing a lookup table to determine the density associated with a ratio of the photon activity.

After reading the information disclosed herein, those of ordinary skill in the art will realize that many other embodiments may be realized, but in the interest of brevity, these are not listed here.

In summary, the apparatus, systems, and methods disclosed herein provide an innovative combination of ultrasonic and nuclear technology for ultrasonic tool calibration, using the high resolution provided by a nuclear device to detect borehole fluid density. Indeed, the nuclear device readings can be used to determine borehole fluid density in real time. As a result, the accuracy obtained during the cement impedance inversion process is also improved, regardless of whether LWD, wireline, or customer-supplied data are used, enhancing the value of services provided by an operation/exploration company.

The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. An apparatus, comprising:
   a tool housing;
   an array of detectors attached to the tool housing and mechanically coupled to an angled collimator to determine density of drilling fluid associated with photon activity in the drilling fluid, wherein the angled collimator comprises an array of tubes to direct photons engaged in the photon activity from the drilling fluid to the array of detectors, and wherein each of the tubes is disposed at a substantially similar angle to a plane comprising the array of detectors; and
   a processing unit attached to the tool housing, the processing unit to determine acoustic impedance of the drilling fluid as a combination of the density and acoustic velocity in the drilling fluid.

2. The apparatus of claim 1, wherein the tool housing comprises one of a drilling collar or an array nuclear logging tool.

3. The apparatus according to claim 1, wherein the array of detectors comprises an array of X-ray detectors.

4. The apparatus according to claim 1, wherein the array of detectors comprises a substantially linear arrangement of detector elements.

5. The apparatus of claim 1, wherein the tubes are arranged so that the substantially similar angle provides a plurality of travel path lengths from a source of energy that generates photons engaged in the photon activity.

6. The apparatus according to claim 1, further comprising:
   a source of energy comprising an X-ray tube to direct the energy into the drilling fluid, to generate the photon activity.

7. The apparatus according to claim 1, further comprising:
   a memory having a lookup table stored therein, the lookup table comprising information associating the photon activity with the density.

8. A system, comprising:
   a tool housing;
   an array of detectors attached to the tool housing and mechanically coupled to a collimator to determine density of drilling fluid associated with photon activity in the drilling fluid, wherein the collimator comprises an array of tubes configured to direct photons from the drilling fluid to the array of detectors, and wherein each of the tubes is disposed at a substantially similar angle to a plane comprising the array of detectors;
   an ultrasonic transducer to measure acoustic velocity in the drilling fluid; and
   a processing unit to determine acoustic impedance of the drilling fluid as a combination of the density and the acoustic velocity.

9. The system according to claim 8, wherein the tool housing comprises an ultrasonic logging tool, and wherein the ultrasonic transducer comprises a mud transducer.

10. The system according to claim 8, wherein the tool housing comprises one of a wireline tool or a drilling tool.

11. The system according to claim 8, the processing unit is located remotely from the tool housing, at a surface of the Earth.

12. A method, comprising:
   determining density of drilling fluid associated with photon activity in the drilling fluid using an array of detectors, wherein said determining density comprises determining a plurality of densities of a corresponding plurality of photon travel path lengths determined by an angled collimator mechanically coupled to the array of detectors; and
   determining acoustic impedance of the drilling fluid as a combination of the density and acoustic velocity.

13. The method according to claim 12, further comprising:
   measuring the photon activity by counting Compton backscattering events.

14. The method according to claim 12, wherein determining the density further comprises:
   accessing a lookup table to determine the density associated with a ratio of the photon activity.

15. The method according to claim 12, further comprising:
   determining the acoustic velocity using an ultrasonic transducer.

16. The method according to claim 12, wherein determining the acoustic impedance further comprises:
   inverting the density and the acoustic velocity to provide the acoustic impedance.

17. The method according to claim 12, further comprising:
   directing energy comprising X-rays into the drilling fluid; and
   counting Compton backscattering events associated with photons created by interaction of the energy and the drilling fluid, wherein the events are monitored along an angle to the array of detectors.

18. The method according to claim 12, wherein determining the density further comprises:
   averaging a plurality of densities of a corresponding plurality of photon travel path lengths determined by an angled collimator mechanically coupled to the array of detectors.

* * * * *